Feb. 21, 1967   N. A. SCHUSTER ET AL   3,305,032
WELL COMPLETION APPARATUS
Filed June 11, 1964   3 Sheets-Sheet 1
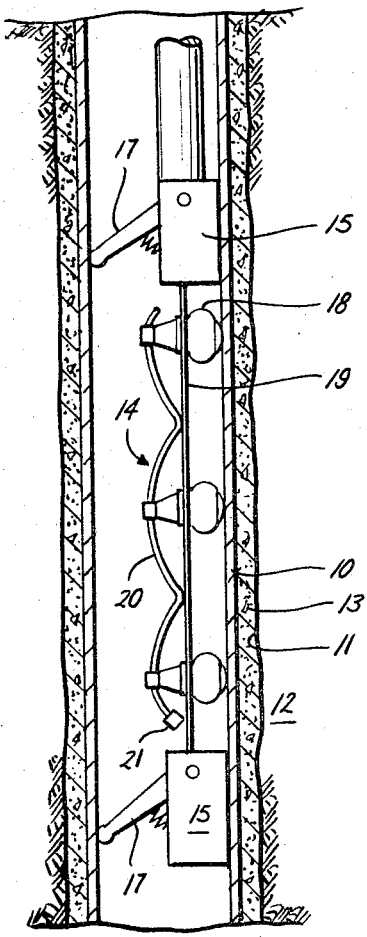
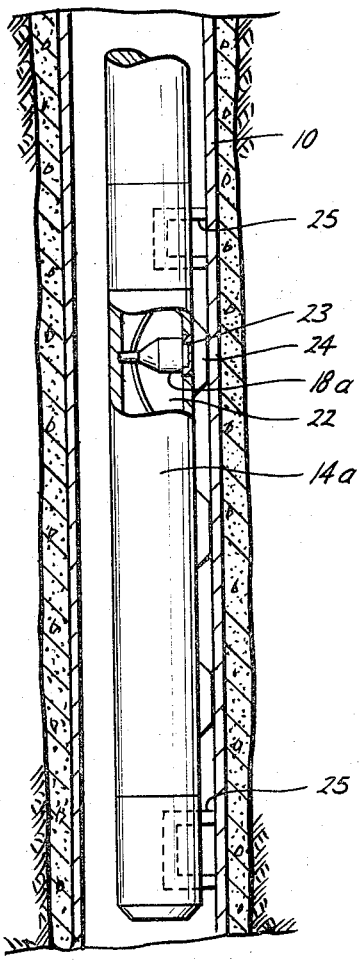
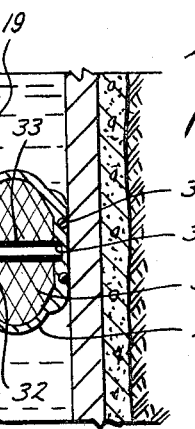
Nick Schuster
William T. Bell
INVENTORS
BY Ronald H. Fidler
ATTORNEY

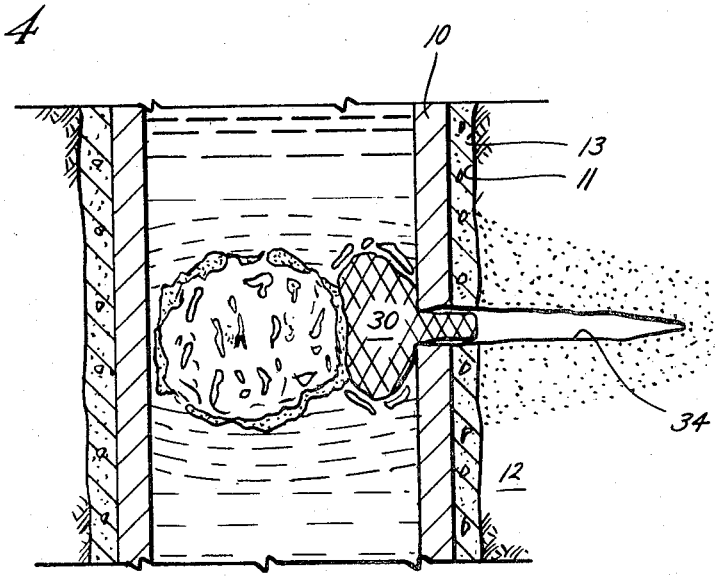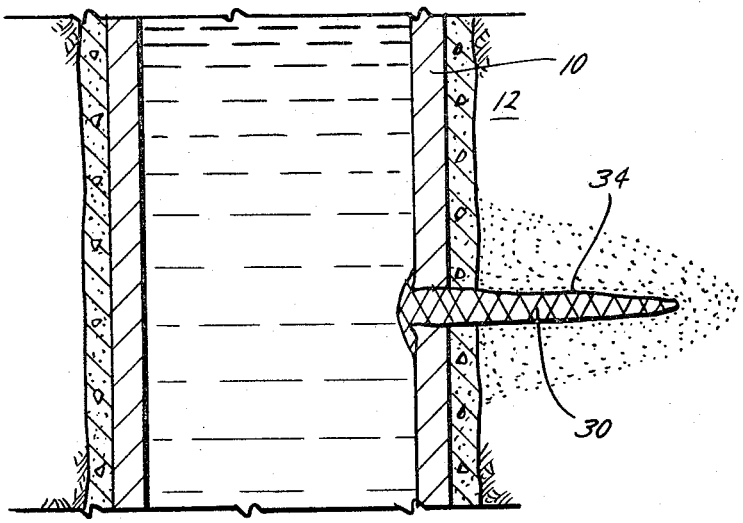

Feb. 21, 1967 N. A. SCHUSTER ETAL 3,305,032
WELL COMPLETION APPARATUS
Filed June 11, 1964 3 Sheets-Sheet 3
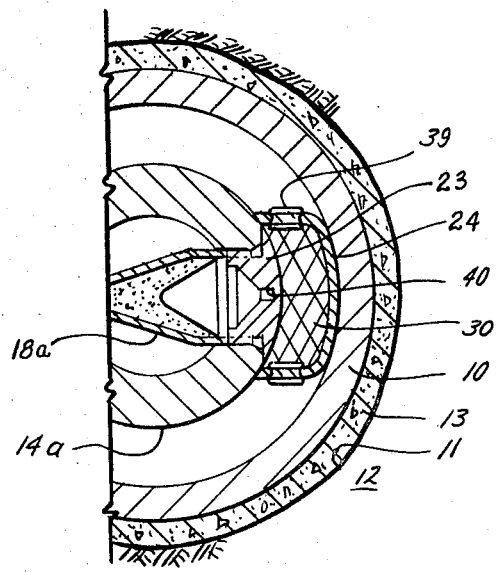
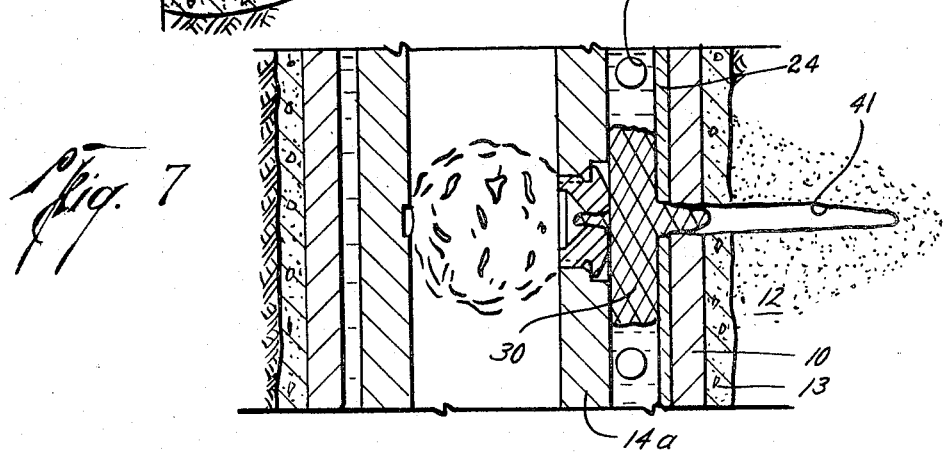
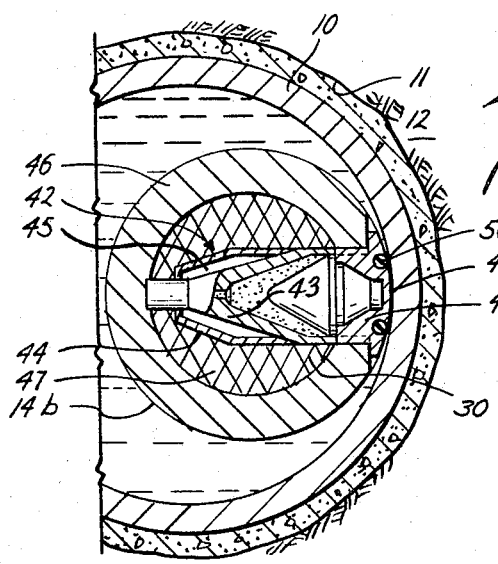
Nick Schuster
William T. Bell
INVENTORS
BY *Donald H. Fidler*
ATTORNEY

United States Patent Office 3,305,032
Patented Feb. 21, 1967

3,305,032
WELL COMPLETION APPARATUS
Nick A. Schuster and William T. Bell, Houston, Tex., assignors, by mesne assignments, to Schlumberger Technology Corporation, Houston, Tex., a corporation of Texas
Filed June 11, 1964, Ser. No. 374,473
11 Claims. (Cl. 175—4.52)

This invention relates to completion of oil wells and, more particularly, to completion of oil wells using shaped explosive charges. The present invention also involves shaped charge perforator arrangements which solve the problem of plugged or damaged perforated holes in oil wells shot in the presence of common drilling fluids or "mud."

In current oil field practice, a considerable number of wells are perforated in the presence of drilling muds in the well, with hydrostatic pressures in the casing exceeding the pressure of the earth formations. Two problems are promoted in such a completion. First, in each of the perforations a strong and largely impervious mud plug is deposited in the same manner as the mud filter cake is formed on the wall of the well bore during drilling. This occurs because the drilling fluid which enters a perforation loses its filtrate (or liquid vehicle) to the porous and permeable formations, and the solids of the drilling fluid are deposited in a perforation to form a substantial plug.

When the pressure in the well bore is subsequently reduced to produce the fluids from the formations, a few of the perforations give up their plugs ahead of the others. When that occurs, the fluids from the formations flow into the casing of the well. The flow of formation fluids reduces the differential pressure between the bore of the casing and the earth formations to a point where the pressure on the remaining perforations is insufficient to remove the plugs. Thus, any number of the perforations can be non-functional.

From observations, it appears that the majority of formation fluids produced from a well completed in the above-described manner is that which flows through only a few effective perforations. The resulting rates of fluid flow through producing perforations are understandably excessive. In non-consolidated formations, sand is produced more rapidly to fill the casing; and in dual completions, the production tubing is damaged by fluid jet impingement. Of even greater concern, certain zones within the formations isolated between impermeable strata may not even be produced.

Secondly, where the type of drilling fluid is not carefully chosen and controlled, the filtrate loss through the perforated hole into the formation causes certain types of clays present in formations to swell and subsequently reduce permeability to the point of "shut-off." This mechanism is often referred to as "water block." Moreover, certain drilling fluid filtrates contain chemicals which are incompatible with formation fluids. Precipitates can be formed as a result of mixing of the dissimilar fluids and another type of blocking effect results.

The problem of plugged or damaged perforations by drilling fluids has long been recognized by the oil industry. Where possible, completion techniques are practiced which prevent drilling mud from coming in contact with the perforated hole or exposed formation during well completions. Some of the methods being applied are:

*(1) Permanent completion technique*

By far the most successful to date, this technique involves reduction of the hydrostatic pressure in the casing to some value below the pressure of the formation during completion. When the perforating tool is then lowered and fired, the direction of fluid flow is necessarily toward the bore of the casing. Thus, the conditions under which plugs are formed are eliminated and incompatible fitrates are not introduced to the earth formations.

Some oil operators take the additional precaution of displacing the drilling fluid present in the casing and replacing it with a compatible completion fluid that is non-plugging and produces no damage to the formation. Such action provides assurance of a successful completion even though an error may be made in adjusting the direction of differential pressure prior to perforating. While complete displacement is highly desirable, it is also more costly.

When properly engineered, the permanent completion system offers the advantage of protecting the perforation. It requires, of course, that differential pressure between the casing and reservoir be properly adjusted before perforating. It also requires that adequate well head pressure control equipment be installed to accommodate the pressure differences to be expected. This becomes particularly critical when the usual low specific gravity completion fluids are employed in the well. Hydrostatic pressure in the casing, used to control or contain reservoir pressures during completion, is a function of the specific gravity of the fluid and the depth of the fluid column. Further, all well head control equipment and downhole production tubing and packer must be installed before perforating, requiring that the smaller diameter and less effective through-tubing perforators be employed to complete the well.

The fact that the reservoir pressure is not always known with sufficient accuracy to allow proper adjustment of differential pressures aggravates the permanent completion method. For example, normal pressure in a new well of 15,000 feet in depth might be expected to approximate 7,500 p.s.i. However, when the pressure is generally due to overburden loads, these pressures can approach 15,000 p.s.i.

*(2) Partial displacement with compatible completion fluids*

Some oil operators do not prefer to follow the permanent completion procedures to assure efficiently performing perforations. Rather, they prefer to simply displace the drilling fluid from the casing opposite the zone of interest. A compatible non-plugging fluid is used.

While partial displacement would achieve the desired result, it is often difficult to set the well up properly. Most compatible completion fluids are of different chemical composition and substantially lower specific gravity than drilling muds. It is often uncertain that the desired completion fluid has been properly displaced and located at the proper depth. Mixing of the two fluids has been experienced. Certain mixing combinations cause the mud solids and the compatible fluid (at the upper interface) to settle out. The usual result is bridging of the casing.

While the above known methods can obtain clean perforations and no formation damage, many oil operators continue to shoot under heavy muds and to tolerate the resulting problems. Their reluctance to complete wells according to permanent completion and displacement techniques stems primarily from lack of confidence in well head control equipment and the additional expenses involved in the operations.

Considerable effort has been devoted toward the design of shaped charges to produce cleaner holes. Progress has been made. The slug or carrot problem of shaped charges has been essentially eliminated. Much of the objectionable charge case debris formerly responsible for plugging the perforated hole has been minimized. None of the methods developed, however, are oriented toward preventing the formation of mud plugs in the perforation—nor the loss of damaging mud filtrates into the earth formations.

The present invention concerns means for allowing an oil well to be perforated in drilling fluid without either plugging of the perforation or damage to the earth formations constituting the reservoir. Differential pressures toward the formation may be maintained as established during drilling operations. Problems of pressure control are therefore eliminated. No special well set-up or operations are required. In other words, the present invention has the advantages of both the permanent completion methods and conventional mud shooting techniques.

In the present invention, a non-plugging, non-hardening, compatible, and low filtrate loss substance is combined with the shaped charge in such a manner as to deposit the material within the perforated hole to the exclusion of the well bore drilling fluid. This is accomplished during and immediately following the penetrating process. The substance deposited may consist of any nonplugging fluids such as the commercially available oil base "Black Magic" or "Plug-Ban." Other chemicals in the liquid or powdered state may also be employed which would be effective in preventing the formation of a mud plug, and whose resultant filtrates would be compatible with the constituent formation fluids and solids.

Once the desired substance is deposited in the perforation, it is held in place by the differential pressure of the mud column. The well may then be completed by simply reducing mud pressure in the casing to some value below the formation pressures. The protective substance in the perforation then flows back into the casing, allowing the clean and undamaged perforation to function efficiently.

The novel features of the present invention are set forth with particularity in the appended claims. The present invention both as to its organization and manner of operation, together with further objects and advantages thereof, may best be understood by reference to the following description when taken in conjunction with the accompanying drawings in which:

FIG. 1 is a longitudinal view of a shaped explosive charge perforating apparatus constructed in accordance with the present invention and shown disposed in a well bore;

FIG. 2 is a view in longitudinal cross-section of a variation of shaped explosive charge perforating apparatus constructed in accordance with the invention and shown disposed in a well bore;

FIGS. 3–5 are side views in detail of a portion of the apparatus illustrated in FIG. 1 in time sequence of operation;

FIGS. 6 and 7 are top and side views, respectively, in detail of a portion of the apparatus illustrated in FIG. 2 in time sequence of operation; and FIG. 8 is a top view in detail of a variation of the invention.

In FIG. 1 of the drawings, there is illustrated a casing 10 in a well bore 11 which traverses earth formations 12. A column of cement 13 is disposed between the casing and well bore. Shaped charge apparatus 14 can be suspended in the casing in any usual manner and includes a number of shaped charge capsules 18 which are attached to a rigid retrievable carrier 19 such as rods or a strip. Blasting cord 20 for detonation of the charges is connected to an electric blasting cap 21 which can be electrically ignited in the usual manner from the surface by wires and a power source (not shown).

At suitable locations, positioning devices 15 are attached to the carrier 19. Positioning devices 15, for example, can be housings with arm members 17 spring biased outwardly so as to bring the forward faces of the shaped charge capsules 18 into contact with the wall of the casing. To do this, of course, requires the suitable positioning of arms 17 relative to the carrier 19 and capsules 18.

In FIG. 2, a retrievable, re-usable steel housing carrier 14a is illustrated wherein shaped charges 18a are disposed within the fluid-tight interior 22 of the housing. Port covers 23 through which a perforating jet may pass are located adjacent the forward end of each charge. In front of each cover 23 is a container 24. Carrier 14a has permanent magnets 25 aligned relative to the port covers so as to bring the containers 24 into proximate contact with the wall of the casing.

It will be appreciated that the positioning devices as heretofore described can be interchanged so long as the function of bringing a portion of the shaped charge apparatus into proximate contact with the wall of the casing is achieved.

In FIG. 3, the expendable shaped charge capsule device 18 is illustrated in detail. The device 18 includes a case 27 for a shaped charge explosive 28 and a front cover or fluid container 29. The case 27 and container 29 are of such character and material as to fragment from detonation of the charge explosive 28. The case 27 and container 29 may be constructed, for example, of aluminum, glass, ceramic, or other material. Ordinarily, break-up of the case and cover will occur as the perforating jet is completing the penetration of the formation. Container 29 is received over the forward end of the case 27 and has a shoulder 31 which abuts the case 27. The outer face of the container has a curvature complementary to the curvature of the casing wall. A disc-like cap member 32 is fitted into the forward end of the case 27 and has a central bore portion which receives a jet tube 33 constructed of frangible material. Jet tube 33 is located along the axis of the charge (and perforating jet) and also fits into a counterbore 34' in the interior of container 29. Jet tube 33 effectively extends the standoff of the charge, allowing better lengthening and stretching of the jet. Penetration is thus substantially enhanced.

The container 29 is sized to contain an amount of non-plugging compatible fluid 30 which exceeds the volume of perforated hole that the charge 28 can make. The front surface of the container 29 is arranged to be positioned snugly against the wall of the casing at zero clearance by means of a suitable gun positioning device as illustrated in FIGS. 1 and 2. Gun positioning is an essential factor in properly locating the fluid 30 so as to permit injection of the fluid to the perforation by means of hydrostatic pressure. The device 18 may have its interior maintained at atmospheric pressure or the interior can be balanced with the hydrostatic mud pressure in the casing in a well-known manner through the use of common equalizing techniques.

In the process of detonation of explosive 28 (initiated by a blasting cord 20), the hydrostatic head or fluid in the casing is momentarily displaced by the expanding gas bubble and pressure of the shock wave (see FIG. 4). As the penetration of the perforating jet approaches its maximum depth, an essentially empty and pressure-free perforation 34 is formed. The strategically located non-plug fluid 30 is then forced toward and into the void penetration by the returning pressure of the displaced hydrostatic head. FIG. 4 depicts the process a few microseconds after the perforation 34 is formed by the perforating jet. FIG. 5 shows the same perforation 34 filled with the non-plug fluid 30 after action of the hydrostatic pressure on the non-plug 30.

The perforation is now fully protected from the mud. A reversal of differential pressure will displace the non-plug fluid 30 and allow formation fluid to be produced unimpeded. Although some debris from the charge case can enter the perforation, the nature of the fluid 30 will prevent its consolidation. Such debris will therefore flow back with the fluid 30.

The container 29 of the device has been depicted as frangible in the interest of minimizing objectionable debris after perforating. Should character of debris not be an important consideration, however, a non-frangible material could be employed equally well. In such case, a seal 35 such as an O-ring would be added to the face of container 29 to contact the wall of the casing to prevent mud bypass and contamination of the non-plug substance 30.

In terms of strategic location of the non-plug substance 30, about which this phase of the invention revolves, the substance 30 could be located additionally within chambers surrounding the sides and back of the charge by enlarging the container 29 to provide such space.

FIG. 6 illustrates the same principle of the invention disclosed in FIGS. 3–5 as applied to the conventional hollow carrier, steel retrievable shaped charge guns. In this arrangement, the non-plug substance 30 is located in front of the charge port plug 23 within a suitable thin-walled container 24. The outer face of the container 24 has a curvature complementary to the curvature of the casing and is held snugly against the wall of the casing as indicated before. The container 24 may be of the retrievable type as shown or may be expendable. The container 24 may be pressurized or pressure-balanced by use of ports receiving rubber plugs 39. Since fluid 30 is essentially incompressible and completely fills container 24, plugs 39 will be retained in place. The container, if desired, may extend longitudinally throughout the length of the gun rather than being separately mounted for each charge.

In the arrangement shown in FIGS. 6 and 7, the perforating jet penetrates a small diameter orifice 40 in a port plug 37, continuing through the non-plug fluid 30 into the casing and formation. The steel gun body 14a is not damaged by the explosion of the charge 18a nor is the retrievable container 24. Hydrostatic pressure then forces the plugs 39 inwardly, driving the non-plug substance 30 simultaneously into the perforation and through the small diameter orifice 40 of the port plug into the carrier. Fluid will enter the perforation 41, of course, at a much greater rate than the small orifice 40. The orifice 40 in the port plug serves as a choke. Its size may be adjusted to assure adequate filling of the perforation 41.

Alternatively, the port plug orifice 40 may be shaped to be plugged by the slug or carrot of the shaped charge 18a, thereby directing all flow of non-plug substance 30 into the perforation.

Ideally, mud ports for the plugs 39 in the fluid container 24 for pressure balancing and mud entry are located approximately between vertically mounted charges in the gun as shown in FIG. 7. In this manner, fingering of inrushing mud into the perforation (or mixing of fluids) is minimized. The non-plug fluid 30 located between charges is also properly brought into play.

It will be appreciated that a jet tube, such as shown at 33 in FIG. 3, can be used which would enhance the performance of the shaped charge. This jet tube could also be foreshortened and its bore tapered from the base outwardly to enhance injection to the formation and plugging of the port hole opening.

Another mechanism, making use of explosion pressures to inject the desired substance into the perforated hole, is shown at 14b in FIG. 8. Illustrated is a shaped charge 42 consisting of a sealed inner and outer case 43 and 44 forming an air space 45 therebetween. The charge 42 is mounted within the housing 46 positioned to contact the wall of the casing as heretofore described. Non-plug fluid 30 fills the space 47 between the outer charge case 44 and the inside wall of the housing 46. The charge and fluid may be maintained at atmospheric pressure.

The forward portion of the charge 42 is sealed against the base of the port plug 48 to prevent non-plug fluid 30 from entering the shaped charge liner cavity and interfering with jet formation.

The air space 45 provided around the charge is adjusted to minimize carrier deformation when the charge detonates. The forward face 49 of the port cover 48 is shaped with a curvature complementary to the curvature of the casing.

In this embodiment, the non-plug substance 30 is injected into the empty and essentially pressure-free perforated hole immediately following jet penetration. Injection is effected by the extreme chamber pressures resulting from the explosion. Shortly after injection, mud enters the gun carrier through the hole in the port plug penetrated by the jet.

To further enhance the deposition of non-plug substance 30 in the perforation, the arrangement shown may be pressured to a value in excess of that of the hydrostatic pressure before running the device into the well or, while in the casing, by means of a pressure transmitting and/or multiplying device in the carrier housing. Thus, the non-plug fluid would be deposited into the perforation under additional forces. This would merely require a charge case 44 designed to withstand the internal gun pressures anticipated. Under this procedure, a seal 50 between gun port plug and casing should be employed as shown in FIG. 8.

With some variations, hydrostatic pressure may also be utilized in conjunction with the explosive forces for placing the non-plug substance in the perforation. The gun wall of the carrier may be ported to hydrostatic mud pressure at suitable locations between charges or at the ends of the carrier, subjecting the non-plug substance to that pressure. The charge case would be designed to withstand the same pressures. When the gun is positioned and fired, the non-plug fluid is forced into the perforations by drilling fluid entering the gun through the suitably located ports. Again, a seal between port plug and casing is required to assure isolation between the drilling fluid and the substance being injected into the perforation.

The non-plug fluid or substance for injection, for example, can be "Black Magic," "Plug-Ban," jelled kerosine, jelled carbon tetrachloride or the like. "Black Magic" and "Plug-Ban" are names applied to commercially available low fluid loss liquids. "Black Magic" can be obtained from Oil Base, Incorporated, of Houston, Texas, while "Plug-Ban" can be obtained from Humble Oil and Refining Company of Houston, Texas. "Black Magic" is a liquid formulation of diesel oil, air blown asphalt, complex organic matter and lime in weights as desired. The non-plug fluid is generally any one which does not adversely react with formations and is temporary in nature, i.e., can be removed or displaced from the perforation at a selected time.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. Apparatus for completing a cased well comprising: shaped charge means for producing, upon detonation, a perforating jet, container means with a forward face having a curvature complementary to the curvature of a casing disposed forwardly of said shaped charge means and a major portion thereof intersected by the axis of said perforating jet, said container means enclosing a non-plugging fluid, means for applying pressure to such fluid in said container means for injecting such fluid into a formed penetration, and means for positioning said forward face of said container means in contact with the wall of a casing.

2. Apparatus for completing a cased well comprising: shaped charge means for producing, upon detonation, a perforating jet, container means disposed forwardly of said charge means, said container means enclosing a nonplugging fluid and having a forward wall portion with a face curved complementarily to the curvature of a casing, frangible tube means extending between said shaped charge means and said forward wall portion, and means for positioning said forward face of said container means in contact with the wall of a casing.

3. Apparatus for completing a cased well comprising: shaped charge means for producing, upon detonation, a perforating jet and including a frangible enclosure as well as a cover plate, container means constructed of frangible material and disposed forwardly of said shaped charge means, said container means enclosing a non-plugging fluid, and having a forward wall portion with a face curved complementarily to the curvature of a casing, frangible tube means extending between said cover plate and said forward wall portion, and means for positioning said container means in contact with the wall of a casing.

4. Apparatus for completing a cased well comprising: shaped charge means for producing, upon detonation, a perforating jet, container means disposed forwardly of said shaped charge means, said container means enclosing a non-plugging fluid and having a forward wall portion with a face curved complementarily to the curvature of a casing and a major portion thereof intersected by the axis of said perforating jet, annular seal means disposed in said forward face for sealing against a well bore wall, and means for positioning said forward face of said container means in contact with the wall of a casing.

5. Apparatus for completing a cased well comprising: shaped charge means for producing, upon detonation, a perforating jet, container means disposed forwardly of said shaped charge means, said container means enclosing a non-plugging fluid and having a forward wall portion with a face curved complementarily to the curvature of a casing, seal means in said forward face disposed about an area through which a penetrating jet passes, frangible tube means extending between said charge means and said forward wall portion, and means for positioning said forward face of said container means in contact with the wall of a casing.

6. Apparatus for completing a cased well comprising: a retrievable thick-walled carrier housing, shaped charge means disposed in said housing facing in one direction and adapted, when detonated, to produce a perforating jet, container means disposed on said housing forwardly of said shaped charge means so that a perforating jet when formed will pass through a major portion thereof, means separating said shaped charge means from the interior of said container means and adapted to be easily penetrated by a perforating jet, said container means enclosing a non-plugging fluid.

7. Apparatus for completing a cased well comprising: a retrievable thick-walled carrier housing, shaped charge means disposed in said housing facing in one direction and adapted, when detonated, to produce a perforating jet, container means disposed on said housing forwardly of said shaped charge means so that a perforating jet when formed will pass therethrough, means separating said shaped charge means from the interior of said container and adapted to be easily penetrated by a perforating jet, said container means enclosing a non-plugging fluid, means disposed adjacent to said shaped charge means for applying pressure in the cased well to such non-plugging fluid, said pressure applying mean including ports and resilient sealing members for said ports, said container means having a forward portion shaped complementary to the curvature of a casing, and means for positioning said forward portion on a wall of a casing.

8. Apparatus for completing a cased well comprising: a retrievable thick-walled carrier housing, shaped charge means disposed in said housing facing in one direction and adapted, when detonated, to produce a perforating jet, longitudinally extending container means disposed on said housing forwardly of said charge means so that a perforating jet when formed will pass therethrough, means separating said shaped charge means from the interior of said container and adapted to be easily penetrated by a perforating jet, said container means enclosing a non-plugging fluid, means disposed adjacent to said shaped charge means for applying pressure in the cased well to such non-plugging fluid, said container means having a forward portion shaped complementary to the curvature of a casing, and means for positioning said forward portions on a wall of a casing.

9. Apparatus for completing a cased well comprising: a retrievable thick-walled carrier housing, a plurality of shaped charge means disposed in said housing with each of said shaped charge means facing in one direction and adapted, when detonated, to produce a perforating jet, said housing having port and closure means along the axis of said perforating jets for each of said shaped charge means, each of said closure means having a forward portion shaped complementary to the curvature of a casing, each of said shaped charge means having an air chamber disposed about the explosive of said charge means, said housing containing a non-plugging fluid about each of said shaped charge means, and means for positioning said forward portions on a wall of a casing.

10. The apparatus of claim 9 wherein said fluid in said housing is under pressure prior to detonation of said shaped charge means.

11. The apparatus of claim 9 further including second ports in said housing to admit fluid under pressure from the well bore to act on said non-plugging fluid.

References Cited by the Examiner
UNITED STATES PATENTS

| | | | |
|---|---|---|---|
| 2,313,176 | 3/1943 | Shelby | 166—100 |
| 3,010,517 | 11/1961 | Lanmon | 166—100 |
| 3,147,807 | 9/1964 | Whitten | 175—4.52 X |
| 3,174,547 | 3/1965 | Fields | 166—100 X |

CHARLES E. O'CONNELL, *Primary Examiner.*

D. H. BROWN, *Assistant Examiner.*